(12) United States Patent
Pearce et al.

(10) Patent No.: US 9,363,368 B2
(45) Date of Patent: Jun. 7, 2016

(54) CONFIGURABLE CALL RECORDING POLICY

(71) Applicant: Cisco Technology, Inc., San Jose, CA (US)

(72) Inventors: Christopher Pearce, Dallas, TX (US); Shipeng Li, Plano, TX (US); George Gary, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 85 days.

(21) Appl. No.: 14/048,937

(22) Filed: Oct. 8, 2013

(65) Prior Publication Data

US 2015/0098363 A1    Apr. 9, 2015

(51) Int. Cl.
*H04M 1/64* (2006.01)
*H04M 3/42* (2006.01)
*H04M 3/51* (2006.01)
*H04M 3/22* (2006.01)

(52) U.S. Cl.
CPC ............ *H04M 3/42221* (2013.01); *H04M 1/64* (2013.01); *H04M 3/2281* (2013.01); *H04M 3/5175* (2013.01)

(58) Field of Classification Search
CPC ... H04M 3/53; H04M 3/5307; H04M 3/5315; H04M 3/42221
See application file for complete search history.

(56) References Cited

U.S. PATENT DOCUMENTS

| 7,420,927 | B1 | 9/2008 | Garakani et al. |
| 7,738,638 | B1 | 6/2010 | Henderson |
| 8,072,967 | B2 | 12/2011 | Rosenberg et al. |
| 8,199,746 | B2 | 6/2012 | Rosenberg et al. |
| 8,422,641 | B2 * | 4/2013 | Martin, II ................. 379/88.08 |
| 8,488,775 | B2 | 7/2013 | Shaffer et al. |
| 8,532,089 | B2 | 9/2013 | Dalrymple et al. |
| 2002/0071529 | A1 * | 6/2002 | Nelkenbaum ............. 379/88.13 |
| 2004/0207724 | A1 * | 10/2004 | Crouch et al. ............. 348/14.09 |
| 2007/0126858 | A1 * | 6/2007 | Bain ..................... H04N 7/152 348/14.01 |
| 2007/0211876 | A1 | 9/2007 | Othmer et al. |
| 2007/0230446 | A1 * | 10/2007 | Williams et al. .............. 370/352 |

(Continued)

FOREIGN PATENT DOCUMENTS

| GB | 2496598 A | 5/2013 | |
| WO | WO 2010075699 A1 * | 7/2010 | ............... H04N 5/91 |

OTHER PUBLICATIONS

International Search Report and Written Opinion, from PCT/US2014/057995, Jan. 7, 2015, WO.

*Primary Examiner* — Curtis A Alia
(74) *Attorney, Agent, or Firm* — Lempia Summerfield Katz LLC

(57) ABSTRACT

In one embodiment, a communication is established between two endpoints. The communication session may be a video call or an audio call. The communication session may be managed by a call manager using, for example, voice over internet protocol and session initiation protocol. One of the endpoints initiates recording the communication session. The call manager facilitates recording the communication session based on a recording policy associated with the initiating endpoint. The recording policy may specify far end recording, near end recording, or a prioritized order of far and near end recording. The call manager selected an anchor network device for copying the communication session based on the recording policy.

19 Claims, 6 Drawing Sheets

(56) References Cited

U.S. PATENT DOCUMENTS

2008/0069311 A1* 3/2008 Mercuriali .................... 379/85
2010/0316199 A1 12/2010 Martin, II
2011/0116492 A1 5/2011 Byron et al.
2012/0059860 A1* 3/2012 Fotta et al. .................... 707/802

* cited by examiner

CONFIGURABLE CALL RECORDING POLICY

TECHNICAL FIELD

This disclosure relates in general to the field of call recording, and more specifically, to selection of a configurable call recording policy for selecting an anchoring device.

BACKGROUND

Telephone calls may be transmitted over the public switched telephone network (PSTN) or over the internet via the voice over internet protocol (VoIP). Calls are recorded for a variety of reasons. Call centers may record calls for training purposes or for the analysis of the performance of call center operators. Call centers, or others, may record calls for archival and informative purposes so that the call may be referred to or played back at a later date. Law enforcement may record calls for the purpose of surveillance and investigation. Compliance rules, such as Sarbanes-Oxley, may also require certain types of calls be recorded.

The mechanism for the recording a call may be a simple recording device at one endpoint in which a recording is initiated by the push of a button. As sophisticated call management systems have become common, more options for recording calls have become available. A single call may be recorded in a variety of locations, which may or may not be located at a participant of the call. However, challenges remain in optimizing the selection and initialization of the recording at the variety of locations.

BRIEF DESCRIPTION OF THE DRAWINGS

Exemplary embodiments of the present embodiments are described herein with reference to the following drawings.

FIG. 3 illustrates another example system for call recording anchor selection.

DESCRIPTION OF EXAMPLE EMBODIMENTS

Overview

Figure 1:
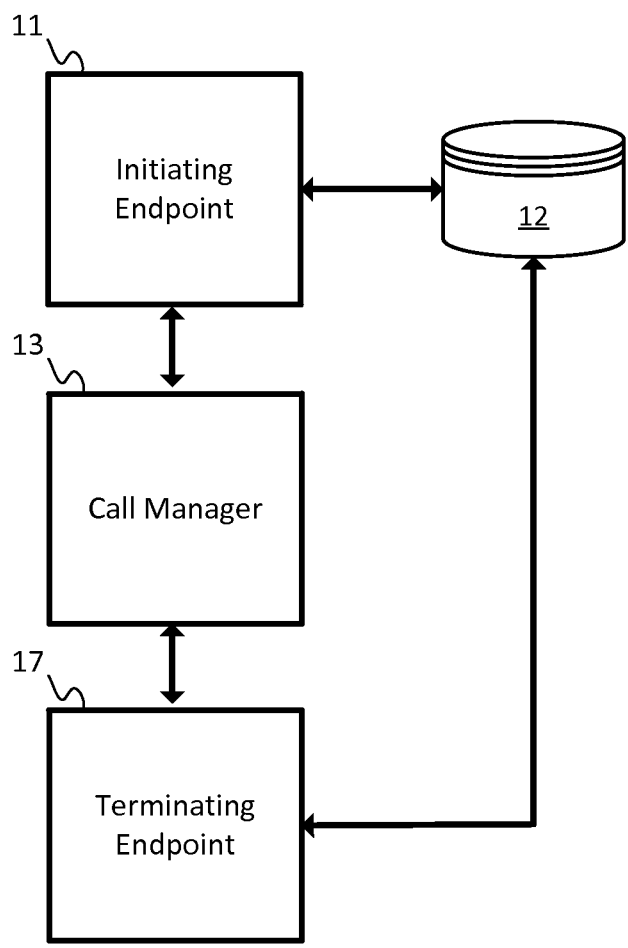

In one embodiment, a communication session between a first endpoint and a second endpoint is established using a call manager. Each of the endpoints may be either a telephone or a gateway. The call manager receives a trigger message to record the communication session from one of the endpoints and selects an anchor network device to direct network traffic to perform a recording of the communication session based on a recording policy.

Example Embodiments

In one example, a call center is an office or business, including a group of endpoints (e.g., phones) for receiving calls. The calls may be requests for customer service, technical support, or product sales. In another example, a call center is the hardware and software within an enterprise for receiving, routing, and sending telephone calls among various endpoints for any purpose. The call center includes a call manager and one or more endpoints. The call manager is hardware, or software executed by the hardware, configured to manage communication between one or more endpoints. The call manager may control call processing, routing, call option (e.g., caller identification), and telephone features (e.g., call hold, call transfer, or conferencing), device configuration, and other telephony functions and parameters.

The call manager may also control the setup of recording of calls between an originating endpoint and a terminating endpoint. The originating endpoint and the terminating endpoint may be any combination of phone(s) and gateway(s). The setup of recording of calls includes a trigger point, selection of anchoring point, and selection of a repository location. The trigger point is the point or points along the call signaling path at which a device determines that a call should be recorded. The trigger point may be a device that initiates the recording. The trigger point may be the originating endpoint, the terminating endpoint, or an intermediary point. The anchor point is the device that duplicates or forks the calls for storage at the repository location. The anchor point may be the originating endpoint, the terminating endpoint, or an intermediate network device.

The call manager may facilitate near end recording or far end recording. In near end recording, the trigger point and the anchor point are at the same endpoint, or at the same location or network. In near end recording, the trigger point may be a function at the call manager that operated on behalf of the endpoint. In far end recording, the trigger point and the anchor point are at different endpoints, or at different locations or networks. The call manager may also facilitate media split anchoring in which both the sides of the call make a copy of their respective portion (e.g., channel) of the media stream to be sent to another address for recording.

Various problems arise depending on what combination of gateways and phones are the anchor point and the trigger point. When only gateways can be anchor points, phone-to-phone calls are not recordable. When only phones can be anchor points, gateway-to-gateway calls are not recordable. In addition, some gateways are not capable of acting as anchor points, and some phones are not capable of acting as anchor points.

The call manager may follow a policy to default to one anchoring technique, if possible, and revert to another anchoring technique if needed. In one example, the call manager defaults to far end anchoring when the far end (the side of the call that is not the trigger point) includes a gateway capable of acting as an anchor point. When the far end triggering device is not a gateway or is not capable of being an anchor point, the call manager reverts to near end anchoring. Some of the following embodiments provide a mechanism for communicating the anchoring capabilities of various gateways and endpoints. Some of the following embodiments establish a recording policy that specifies the preferred type of anchoring when those capabilities are present, and specifies an alternative type of anchoring otherwise.

FIG. 1 illustrates an example system for call recording anchor selection. The system includes an initiating endpoint 11, a repository 12, a call manager 13, and a terminating endpoint 17. Additional, fewer, or different devices may be included in the system for call recording anchor selection.

The call manager 13 establishes a communication session between the initiating endpoint 11 and the terminating endpoint 17. The communication session may include audio, video, or both. The communication session may be VoIP using a signaling communications protocol. The signaling communication protocol may be session initiation protocol (SIP), which may be defined according to request for comments (RFC) 3261 as published in June 2002 and available at http://tools.ietf.org/html/rfc3261. The call manager 13 may administer SIP, skinny client control protocol (SCCP), H.323, media gateway control protocol (MGCP), or other protocols. H.323 may be defined according to the international telecommunication union recommendation H.323 "Packet-based multimedia communication systems," as published in December 2009 and available at http://www.itu.int/rec/T-REC-H.323/. MGCP may be defined according to RFC 2805 as published in April 2000 and available at http://tools.ietf.org/html/rfc2805. The call manager 13 may be referred to as a call control server.

The call manager 13 may establish the communication session through a sequence of invite, OK, and acknowledgment messages between the call manager 13, the initiating endpoint 11, and the terminating endpoint 17. The initiating endpoint 11 generates a trigger message to record the communication session. The trigger message is sent to the call manager 13. The trigger message may be initiated based on a feature button on the initiating endpoint 11. The feature button may be a physical button (e.g., key, touchscreen, or switch) on an IP phone. The feature button may be a selection on a computer telephone integration (CTI) interface. The trigger message may be generated automatically, based on the configured policy in the call manager 13.

The trigger message may include a recording policy for the initiating endpoint 11 or the policy may be stored ahead of time by the call manager 13. The policy may specify an anchoring preference. In one example, the policy may also specify one or more of a repository preference, a device profile, and a capabilities flag for the initiating endpoint 11. Alternatively, data indicative of the device profile and the capabilities flag may be exchanged in the control messages for establishing the communication session.

The anchoring preference may indicate any combination of a preferred anchoring point, a secondary anchoring point, and a tertiary anchoring point. In one example, the anchoring preference may indicate whether far end anchoring or near end anchoring is preferred. A single bit in the triggering message may be used for this purpose (e.g., 1 indicates near end anchoring and 0 indicates far end anchoring).

In another example, more complex logic may be included in the trigger message. The trigger message may define one or more conditions that a particular anchoring point is selected. For example, one condition may be to select the far end anchoring point unless the far end endpoint (e.g., terminating endpoint 17) is not capable of being an anchoring point, and when the far end anchoring point is not capable of being an anchor point, to select the near end endpoint (e.g., initiating endpoint 11), as the anchor point. Another condition may be may be to select the far end anchoring point unless the far end endpoint (e.g., terminating endpoint 17) is a gateway, and when the far end anchoring point is a gateway, to select the near end endpoint (e.g., initiating endpoint 11), as the anchor point. Another condition may be to select media split anchoring if possible. Other criteria may be used.

The capabilities flag indicates whether or not the endpoint is capable of being an anchor point. The capabilities flag may be binary (e.g., 1 for yes, 2 for no). The capabilities flag indicates that the endpoint is configured to analyze a media stream and make a copy of the media stream. The endpoint may be configured to expose an application programming interface (API). The call manager 13 and the endpoints communicate through the API. For example, the call manager may request the endpoint start forking the media stream, or to stop forking the media stream for the recording session. The endpoint may notify the call manager on of the media forking status. This API may use different protocol used between the endpoint and the call manager for call establishment.

The device profile includes data indicative of the type of endpoint. The device profile indicates whether the endpoint is an IP phone or a gateway. Other types of endpoints are possible. The device profile may also include the media access control (MAC) address of the endpoint, a network address of the endpoint, a serial number of the endpoint, and/or a model number of the endpoint.

The capabilities flag and the device profile may be received at the call manager 13, and/or exchanged between the initiating endpoint 11 and the terminating endpoint 17, as part of the setup of the communication session or in response to, the trigger message. The capabilities flag and the device profile of the initiating endpoint 11 may be included in the trigger message of the initiating endpoint 11. The capabilities flag and the device profile of the terminating endpoint 11 may be included in a response message triggered by the trigger message. The response message is generated by the terminating endpoint 17 and sent to the initiating endpoint 11. Alternatively, the call manager 13 may have previously stored the capabilities flag and the device profile for both endpoints.

The call manager 13 is configured to extract the recording policy from the trigger message or from memory and select an anchor network device to direct or fork network traffic to record the communication session based on at least the recording policy. The recording policy may include a repository preference including an address and/or a name of a repository. The repository is memory or other computer readable medium for storing the recording. The repository preference may include a series of alternate repositories in case the primary repository is unavailable, out of storage, or experiencing another error. The call manager 13 generates and sends a forking command including the repository preference to the selected anchor endpoint. Commands may be sent to the selected anchor endpoint using an additional protocol transmitted over SIP, such as Q signaling.

The call manager 13 may also be configured to generate a message (e.g., invite message) for the repository to inform the repository that the media stream will be sent to the repository. The message may include the address of the initiating endpoint 11 and the terminating endpoint 17.

The call manager 13 may facilitate gateway-to-gateway calls, phone-to-phone calls, and gateway-to-phone calls. While all of the calls include a telephone at each end of the communication session, a phone-to-phone call includes a standalone IP phone or soft IP phone on each end of the communication session. In a gateway-to-gateway call, the gateways are connected to a private branch exchange (PBX), the public switched telephone network (PSTN) or another telephony device that connects to the telephone used in the communication session to the gateway. The gateway converts VoIP messages to audio and/or other signals and decoding and encoding the audio media streams to different standard formats. Accordingly, gateway-to-phone calls include a standalone IP phone or soft IP phone on one end of the communication session and a gateway connected to a telephony device on the other end of the communication session.

Figure 2:
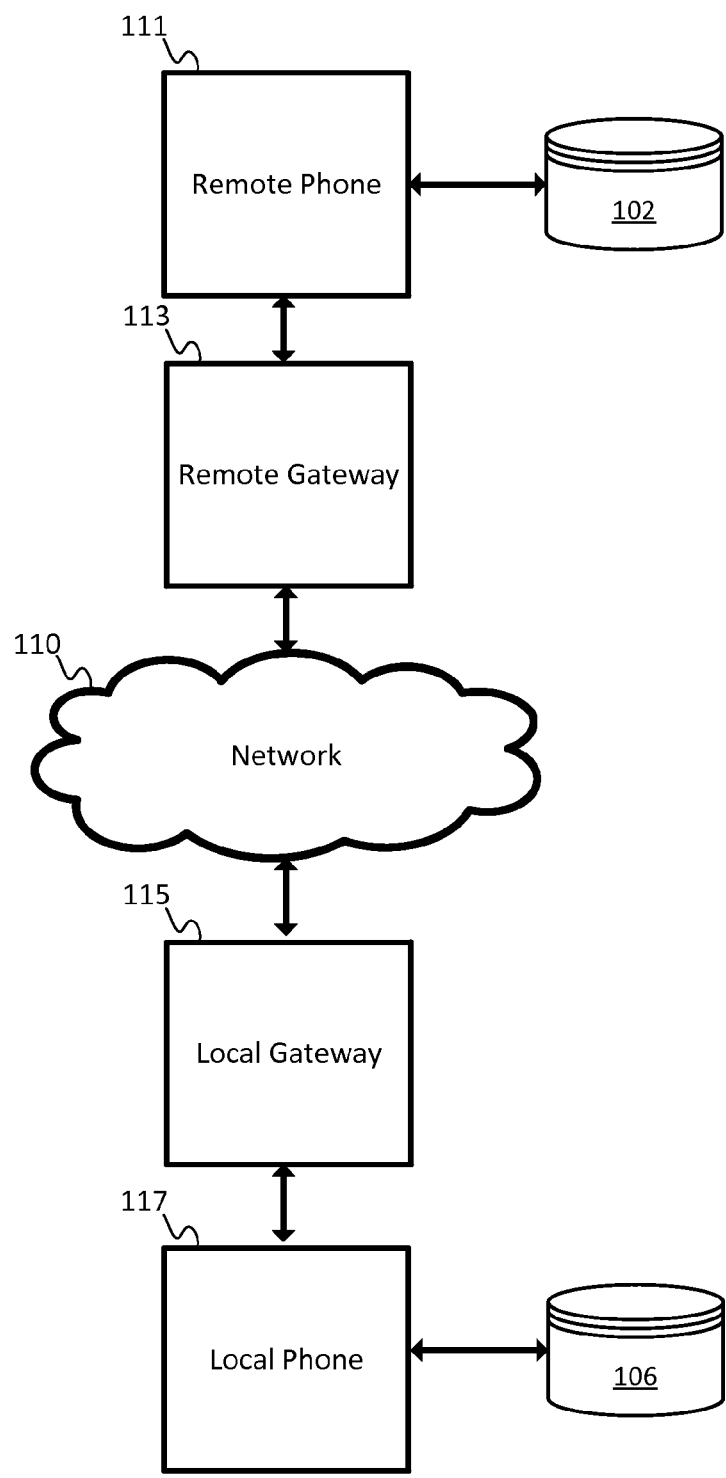
FIG. 2 illustrates another example system for call recording anchor selection.

FIG. 2 illustrates an example system for call recording trigger selection. The system may include a remote phone 111, a remote repository 102, a remote gateway 113, a local gateway 115, a local repository 106, and a local endpoint 117. The terms remote and local designate different ends of a call through the network 110. The network 110 may include a call manager. Additional, different, or fewer components may be provided.

In the example shown in FIG. 2, the phones, the gateways, or any combination are configured to be trigger points and/or anchor points. In addition, the phones, the gateways, or any combination are configured to set up a signalizing component for a VoIP call using control messages. The control messages establish, maintain, and tear down a connection for the call. When one of the devices initiates recording the call, another or the same device is configured to make a copy of the call and send the copy of the call to a repository for storage. The device may also store the recording locally. The device may be an intermediate device (i.e., not the remote phone 111, the remote gateway 113, the local gateway 115 and the local phone 117) configured to fork media streams.

The call may include separate components. A first component corresponds to the remote phone 111, and a second component corresponds to the local phone 117. In one example, both components of the call may be copied or forked by the anchor device. In another example, which may be referred to as media split anchoring, each of the components are copied or forked independently by separate devices.

The local phone 117 calls the remote phone 111. First, the local phone 117 signals the remote phone 111. Control messages are exchanged including media addresses of the local phone 117 and the remote phone 111. Then, data making up the call is transferred between the remote phone 111 and the local phone 117. At some point during the call, a trigger message to start recording the call is generated at the remote phone 111, the remote gateway 113, the local gateway 115 or the local phone 117.

In one example, the trigger message may be in response to a button pressed on the local phone 117. In another example, the trigger message is automatic or in response to a signal received from a third entity. The signal may be for surveillance or quality assurance. The trigger message may be generated at the local phone 117 or the call manager. The trigger message may define an anchor point for recording the call. A predetermined anchor point may be used instead of including the anchor point in the trigger message.

The trigger message may be sent to the remote phone 111, the local phone 117, or the call manager. The trigger message includes an identification of a destination for the recording of the call. The destination may be a storage device or a monitoring device. The identification may be a name, an IP address, or another identifier. The trigger message may include an address for the remote phone 111 in order to facilitate forwarding the trigger message to the remote phone 111.

In response to the trigger message, the remote phone 111 makes a copy of the data for the call and forwards the copy of data to the destination (e.g., repository 102) specified by the trigger message. The copy of the data for the call may be stored according to a time stamp and an identification of the remote phone 111. In addition, the copy of the data may be indexed according to the type of recording. Example recording types include conversation archival, call center monitoring, call analytics, law enforcement, and surveillance.

The remote phone 111, or the storage device, may make a determination on the legal requirements for recording the call depending on the jurisdiction of the remote phone 111, the local phone 117, or the storage device. The jurisdiction may be determined based on a user input or based on IP address. The legal requirements may determine whether the recording of the call is stored. Alternatively, the legal requirements may define whether an audible warning is inserted into the call to inform the call participants that the recording is being made. The audible warning may be a beep or tone that is inserted at a time interval (e.g., 10 seconds), or the audible warning may be a verbal message played before beginning the recording.

Figure 3:
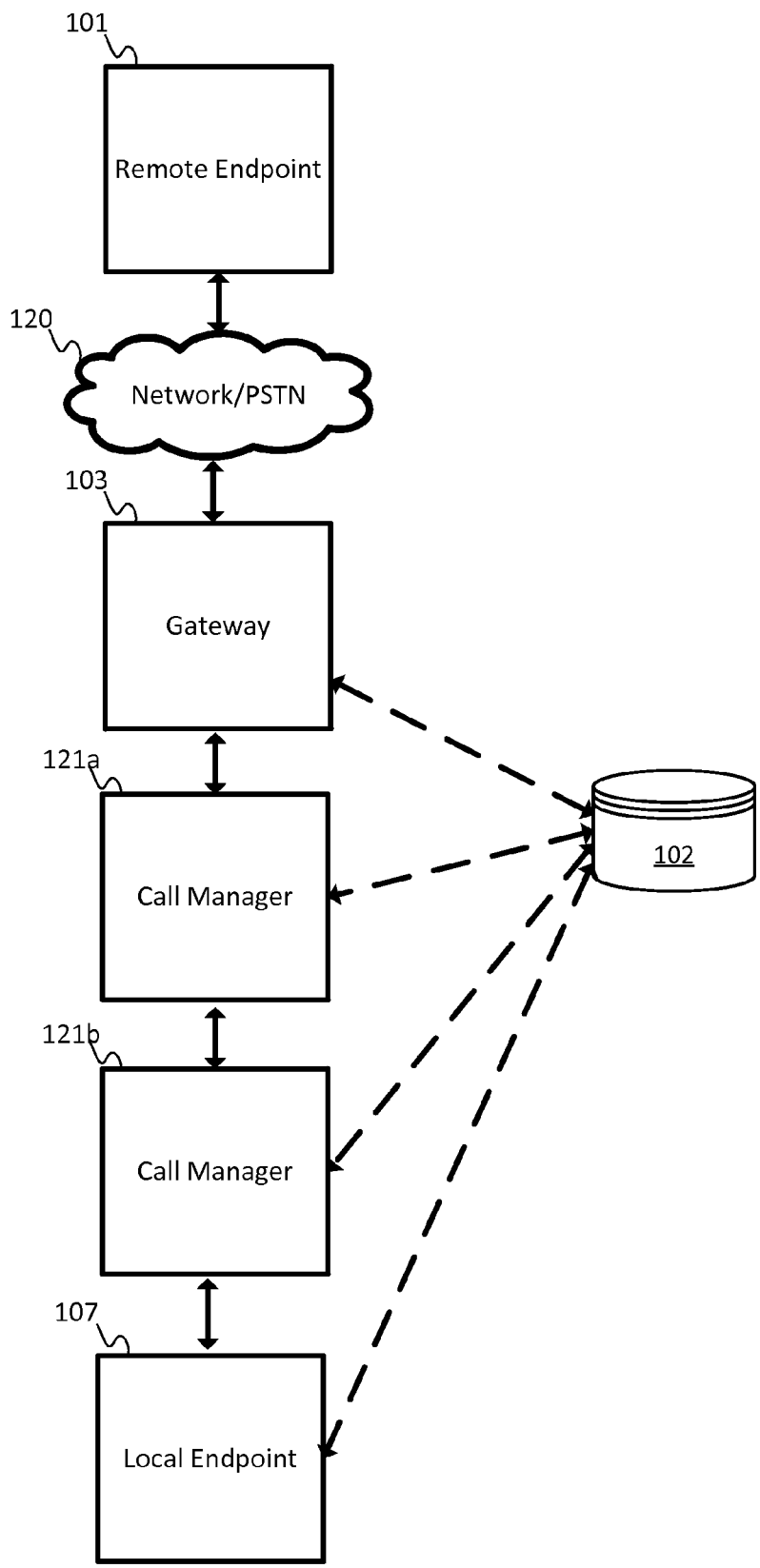
FIG. 3 illustrates an example system for call recording anchor selection.

FIG. 3 illustrates another example system for call recording anchor selection. The system includes a remote endpoint 101, a network 120, a gateway 103, and a local endpoint 107. FIG. 3 illustrates a gateway-to-phone call using multiple call managers 121*a-b*. The network 120 may be an IP network, the public switched telephone network (PSTN) or a combination of an IP network and the PSTN. For example, the remote endpoint 101 may be a traditional telephone or cellular telephone and the local endpoint 107 may be an IP Phone. The remote endpoint 101 may not be directly managed by a call manager but rather indirectly managed by the call manager 121*a* through the gateway 103. Any combination of the devices in the system may be in communication with the repository 102. Additional, different, or fewer components may be provided.

A call is established between the remote endpoint 101 and the local endpoint 107. Regardless of which endpoint initiates the call, either of the endpoints may request to record the call, and any of the devices may fork the media stream to facilitate recording the call. The anchor device that forks the call may be selected by the call manager based on a recording policy. The endpoints may be associated with different call managers.

The recording policy may list in order of priority possible anchor devices. In one example, the call manager 121*a* selects the first device on the list and sends a trigger message to the first device. The first device may respond with an acknowledgement message indicating that the first device is available to fork a copy of the call. The first device may respond with a refusal message. The first device may send the refusal message because the first device is unavailable (e.g., insufficient bandwidth, ports, or another problem) to copy and forward the call. The first device may send the refusal message because the first device is incapable of copying and forwarding the call. The call manager 121*a*, in response to receipt of the refusal message, may select a second device from the recording policy list and send a trigger message to the second device. Based on a response received from the second device, the call manager 121*a* may either proceed down the recording policy list or stop searching for an anchor device when an acknowledgement message is received.

The call manager 121*a* or 121*b* may generate a subsequent protocol specific anchoring command to instruct the anchor device to fork a copy of the call. However, multiple protocols may be used when more than one call manager is included. For example, the anchor device may be sent a SIP or SCCP command. However, the call managers may not be able to use the same protocol and may rely on a second signaling protocol such as Q signaling (QSIG). QSIG provides communication between PBXs and provides services such as line identification, call intrusion, and call forwarding. In addition, the gateway 103 and the call manager 121 may communicate using a third protocol. For example, simple object access protocol (SOAP) over HTTP message may be used by the call manager 121*a* to instruct the gateway 103 to act as the anchoring device. Alternatively, the call manager 121*a* may communicate with the gateway 103 using representational state transfer (REST).

Consider an example in which local endpoint 107 has a policy of being capable of recording calls and preference to the remote endpoint to record calls. As the packets of the call pass between the local endpoint 107 and the gateway 103 through the call managers 121*a-b*, the call manager 121*b* becomes aware that far end anchoring is possible. Data indicative of the policy is included with the call packets received from the gateway 103.

The instruction to record the call or trigger message is received from the local endpoint 107 at the call manager 121b. The call manager 121b sends a QSIG message to the call manager 121a. The QSIG message includes the instruction to record the call. The call manager 121a is configured to convert the QSIG message to a SOAP over HTTP message, which is sent to the gateway 103. The SOAP over HTTP message instructs the gateway 103 to start copying and forwarding the call.

Figure 4:
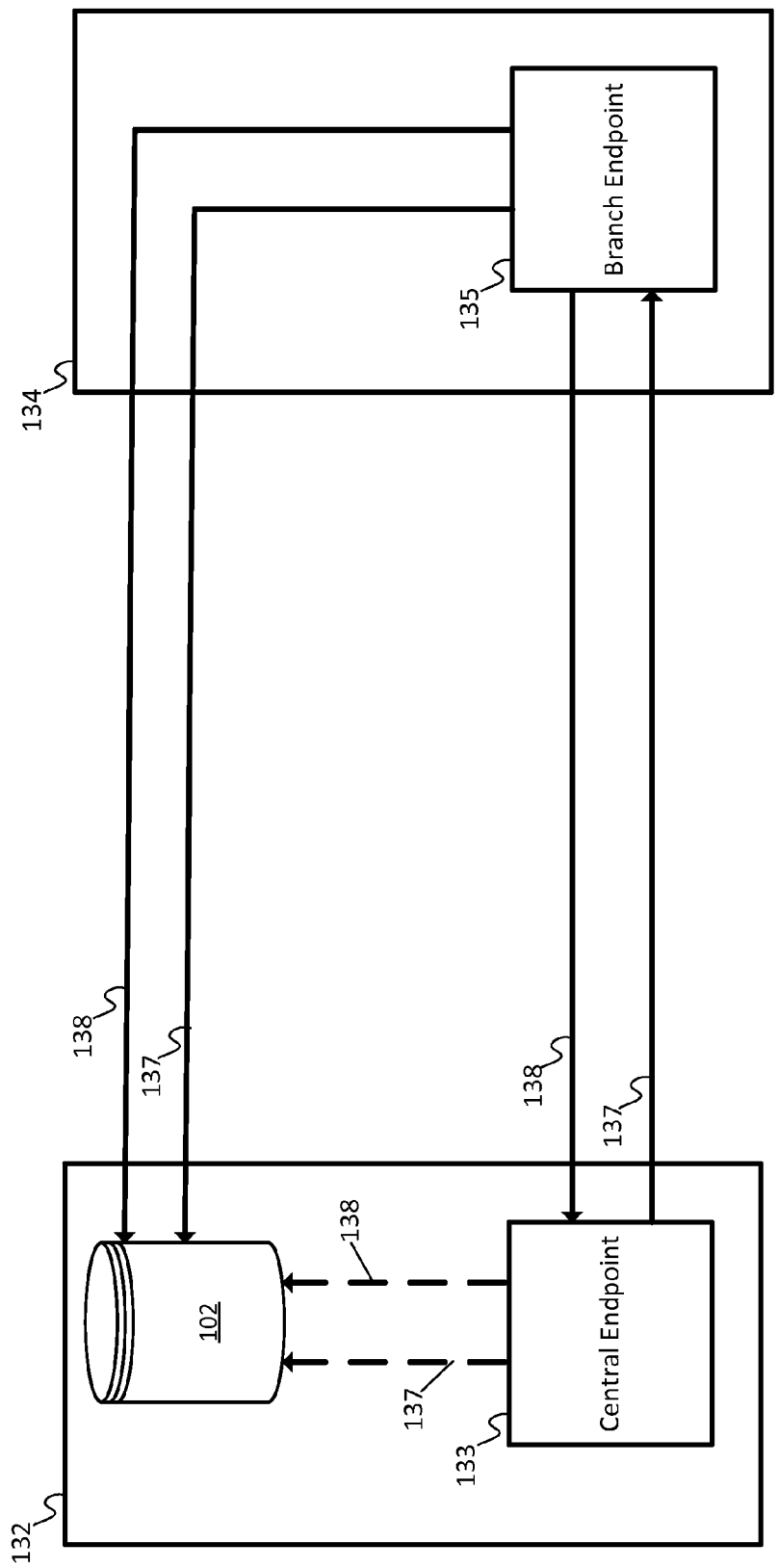
FIG. 4 illustrate a bandwidth reduction using the call recording anchor selection of FIG. 2 or 3.

FIG. 4 illustrates bandwidth reduction using the call recording anchor selection of FIG. 2 or 3. The system of FIG. 4 includes a central location 132 and a branch location 134. The central location 132 may include a central endpoint 133 and a repository 102. The branch location 134 may include a branch endpoint 135.

From the perspective of the branch endpoint 135, a communication session between the branch endpoint 135 and the central endpoint 133 includes a received component 137 and a sent component 138. When the branch endpoint 135 triggers a recording, near-end recording involves the branch endpoint 135 forks or copies the call and sends the copy to the database 102. Far-end recording involves the central endpoint 133 copying the call and sending the copy to the database 103. Because the database 102 and the central endpoint are collocated at the central location 132, communication of the copy of the call is faster and bandwidth between the central location 132 and the branch location 134 is saved. Bandwidth savings may also improve the quality of other calls when multiple calls exist between the central location 132 and the branch location 134.

Consider an example when the central endpoint 133 triggers a call that is forked by the branch endpoint 135. The recording may be disrupted if one or more changes are made to the call. Example changes include transfers, conferences, forwarding to voicemail, or anything that that causes the triggering device to no longer be involved with the call. For example, if the branch endpoint 135 transfers the call to another device, the central endpoint 133 is no longer aware of the policy of the device on the other end of the call. Accordingly, the call manager may be configured to suspend the recording in response to a call feature command.

After suspending the recording, the call manager may request a policy of the new endpoint and identify the new anchor point based on the policy of the new endpoint. The new anchor point may be the new endpoint or the triggering endpoint. For example, if branch endpoint 135 is capable of recording but the new endpoint is not, then the first portion of the call (before the transfer) is forked by the branch endpoint 135 and the second portion of the call (after the transfer) is forked by the central endpoint 133. The repository including database 102 may be configured to combine the two portions of the call.

Another technique may be used when the call feature command is a conference. A conference includes more than two endpoints. The call manager may be configured to consider the recording policy of several endpoints. For example, multiple anchor points may be available, and more than one of the available anchor points may be far end anchor points. The anchor may be selected from the available anchor points based on proximity to the repository, resources, or a priority list.

The call feature command may be received at the CTI interface of the branch endpoint 135. The CTI interface may also include various features such as call information display, automatic dialing, phone control, extended call features, transfers, and/or statistics features. Automatic dialing may include dialing a set of predetermined numbers in a specific order or dialing multiple numbers and connecting the agent when one of the called parties answers. The phone control may include manual dialing, answer, hang up, place on hold, or other phone controls such as play video stream, reconnect with client etc. The phone control may generate CTI commands based on user input (e.g., keypress or touchscreen). The call information display may include the number of the calling party, the number dialed, duration of the call, a name of the calling party, or other information.

Figure 5:
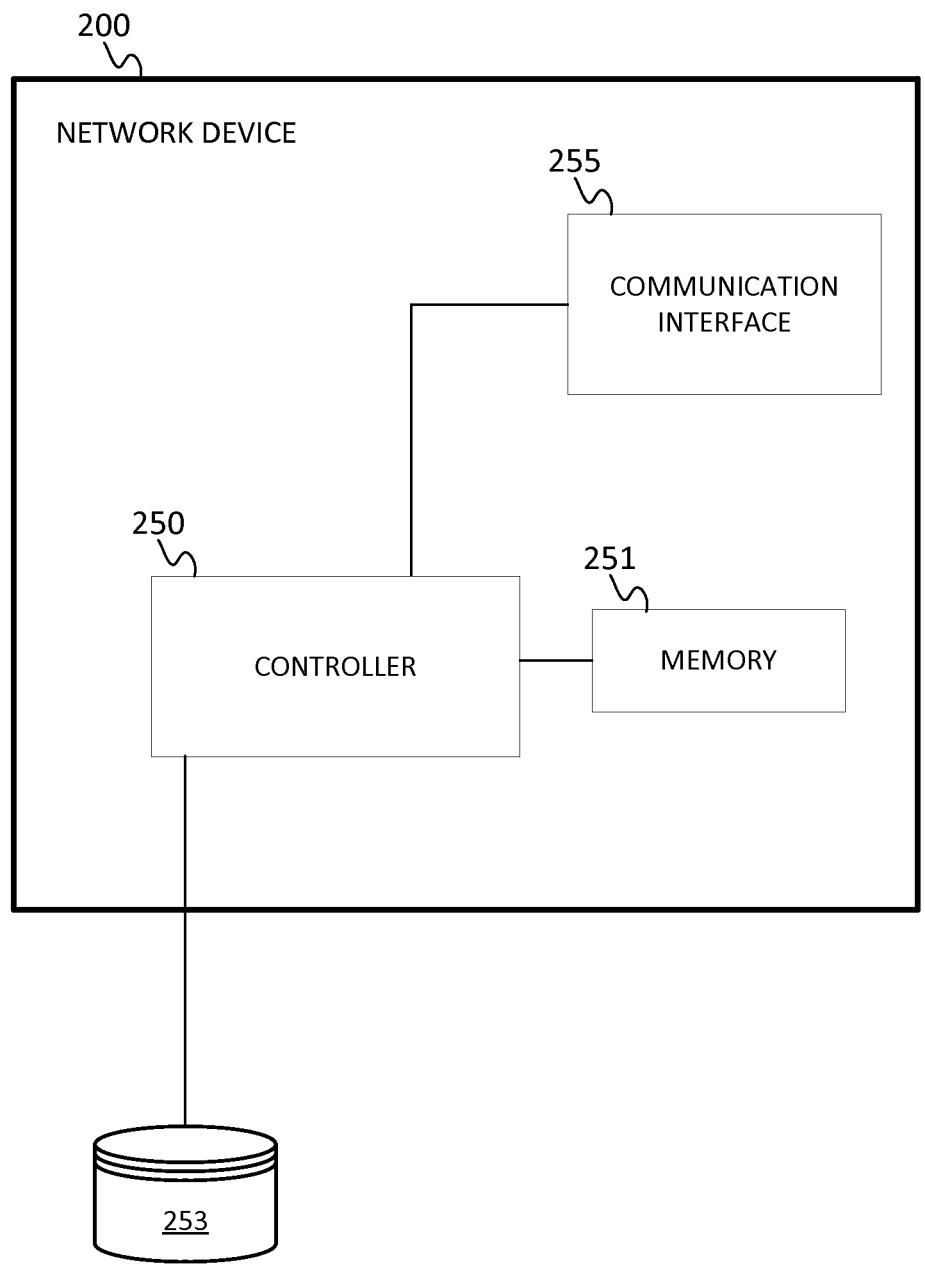
FIG. 5 illustrates an example network device of the system of FIG. 1-3.

FIG. 5 illustrates an example network device of the system of FIG. 1-3. The network device 200 includes at least a memory 251, a controller 250, and a communication interface 255. The network device 200 may include or be coupled with a database 253. Additional, different, or fewer components may be provided. The network device 200 may correspond to any of the call managers, endpoints, gateways, or repositories described above.

The memory 251 or the database 253 may be configured to store a recording policy. The recording policy may be received from an endpoint that initiates a communication session. The recording policy may be predefined as part of the configuration of a call manager. The recording policy may be specified by user input. The recording policy includes one or more potential anchor devices for recording a media stream. The recording policy may be built or modified based on the preferences of the potential anchor devices.

The communication interface 255 is configured to receive a request to record a communication session. The request may be initiated through a user at a telephone associated with the communication session. The user may press a record button on the telephone or on the CTI interface. Alternatively, the recording may be initiated automatically for purposes of quality checking or surveillance. The recording may be initiated automatically based on a schedule or in response to a word said by one of the users during the communication session.

The controller 250 is configured to access the recording policy and extract one or more addresses of the potential anchor points from the recording policy. The controller 250 is configured to direct network traffic to the storage device for recording of the communication session based on the recording policy.

The controller 250 is configured to copy the data packets forming the communication session. The potential anchor point may be the endpoint that sent the request to record the communication session or the potential anchor point or the potential endpoint may be another endpoint in the communication session. The recording policy may list both endpoints in order of priority (e.g., primary anchor point and secondary anchor point).

The controller 250 may also select the anchor point based on the capabilities of the endpoint. The capabilities of the endpoints may be detected by the controller 250. For example, at the beginning of the communication session, the controller 250 may send a control message to the endpoints requesting they report capabilities. Alternatively, the control message may be a message that asks the endpoint to record the communication session. The controller 250 is configured to identify the capabilities of the endpoint based on the endpoint's response to the control message.

The memory 251 or the database 253 may include a device profile for one or more endpoints. The device profile may identify whether the endpoints are standalone IP phones, gateways, or another type of device. The device profile may be entered manually for all of the endpoints in a call center. The device profile may be compiled by the controller 250 based on responses received from the endpoints.

The network device 200 shown in FIG. 5 may be the anchor point. The controller 250 is configured to modify the copied data packets of the communication session received from the call manager. The copied data packets may be modified to include the address of a repository. The repository is a server and/or database configured to store the recording of the communication session. The repository may be combined with another device such as the call manager. The controller 250 may also generate invite messages for the repository to inform the repository of the identity of the communication interface. The invite message may also instruct the repository on indexing the recording.

Figure 6:
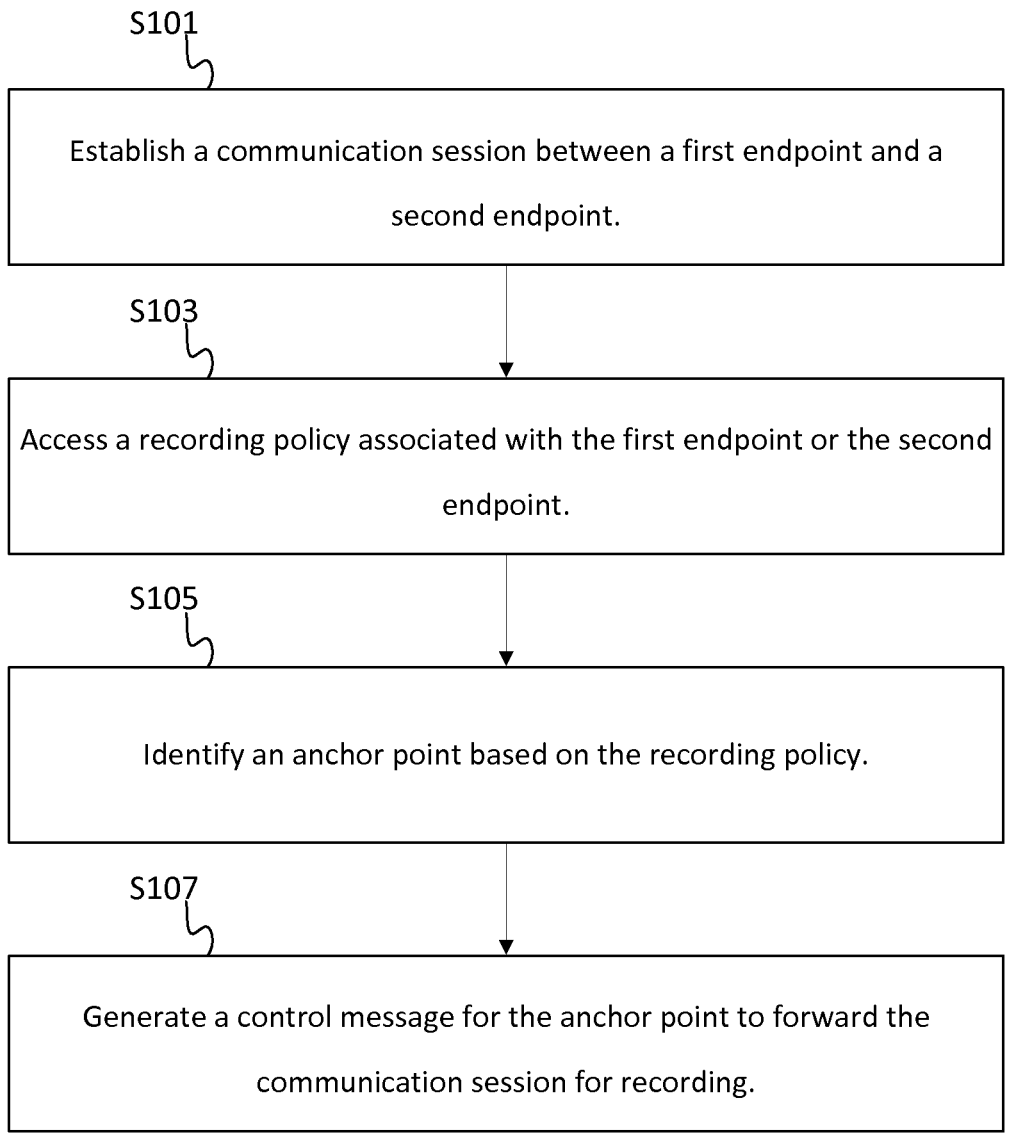
FIG. 6 illustrates an example flow chart for call recording anchor selection.

FIG. 6 illustrates an example flow chart for call recording anchor selection. Additional, different, or fewer acts may be provided. The acts are performed in the order shown or other orders. The acts may also be repeated. The acts may be performed by a call manager, which may be a server, or software running on the server. The call manager includes at least a controller, a memory, and a communication device.

At act S101, the communication device establishes a communication session between a first endpoint and a second endpoint. The endpoints may be any combination of standalone telephones, soft phones running on computers, or telephones connection to PBXs and gateways. The type of endpoint may be stored in a lookup table in memory. In the exchange of the control messages for establishing the communication session, one or both of the first endpoint and the second endpoints advertises a recording policy to the call manager.

At act S103, the controller accesses a recording policy associated with the first endpoint or the second endpoint. The recording policy establishes procedures for recording calls from various endpoints. The recording policy may include a lookup table that associates the identity of the triggering endpoint that requests the call be recorded with an identity of the anchor device that is selected to facilitate recording of the call. At act S105, the controller is configured to access the recording policy to identify the anchor point based on the triggering endpoint.

At act S107, the controller is configured to generate a control message for the anchor point to forward the communication session for recording. The control message may be a SIP message. The control message may specify a location to forward the communication session to and a name or address to index the communication session when it is stored in a database.

Referring back to FIG. 5, the controller 250 may include a general processor, digital signal processor, an application specific integrated circuit (ASIC), field programmable gate array (FPGA), analog circuit, digital circuit, combinations thereof, or other now known or later developed processor. The controller 250 may be a single device or combinations of devices, such as associated with a network, distributed processing, or cloud computing.

The memory 251 may be a volatile memory or a non-volatile memory. The memory 301 may include one or more of a read only memory (ROM), random access memory (RAM), a flash memory, an electronic erasable program read only memory (EEPROM), or other type of memory. The memory 301 may be removable from the network device, such as a secure digital (SD) memory card.

In addition to ingress ports and egress ports, the communication interface may include any operable connection. An operable connection may be one in which signals, physical communications, and/or logical communications may be sent and/or received. An operable connection may include a physical interface, an electrical interface, and/or a data interface.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
   establishing, by a processor, a communication session between a first endpoint and a second endpoint;
   receiving a trigger message to record the communication session; and
   selecting, by the processor, an anchor network device to direct network traffic to perform a recording of the communication session based on a recording policy,
   wherein the recording policy specifies that when a device profile is indicative of a gateway, a near end device is selected to perform the recording of the communication session and when the device profile is indicative of a phone, a far end device is selected to perform the recording of the communication session.

2. The method of claim 1, further comprising:
   accessing profile information for the second endpoint, wherein the anchor network device is configured to direct network traffic to record the communication session based on the recording policy and the profile information.

3. The method of claim 1, further comprising:
   extracting the recording policy from the trigger message, wherein the recording policy is associated with the first endpoint.

4. The method of claim 1, further comprising:
   generating a command including an identification value for the anchor network device to record the communication session.

5. The method of claim 1, wherein the recording policy describes recording capabilities or preferences of the first endpoint.

6. The method of claim 1, wherein the trigger message includes an address for a repository configured to store the recording of the communication session.

7. The method of claim 6, wherein establishing the communication session comprises:
   generating an invite message for the repository for storing the recording of the communication session, wherein the invite message includes an address of the first endpoint or an address of the second endpoint.

8. An apparatus comprising:
   a memory configured to store a recording policy and at least one device profile;
   a communication interface configured to receive a request to record a communication session; and
   a controller configured to access the recording policy and direct network traffic to perform a recording of the communication session based on the recording policy, wherein the recording policy includes a primary anchor device and a secondary anchor device,
   wherein the recording policy specifies that when the device profile is indicative of a gateway, the primary anchor device is selected to perform the recording of the communication session and when the device profile is indicative of a phone, the secondary anchor device is selected to perform the recording of the communication session.

9. The apparatus of claim 8, wherein request to record the communication session is received from the primary anchor device or the secondary anchor device.

10. The apparatus of claim 8, wherein the controller is configured to generate an invite message for a repository device, wherein the repository device is configured to store the recording of the communication session.

11. The apparatus of claim 8, wherein the invite message includes an address of the primary anchor device or an address of the secondary anchor device.

12. The apparatus of claim 8, wherein the controller is further configured to compile each device profile based on responses from the primary anchor device, secondary anchor device or a combination thereof.

13. The apparatus of claim 8, wherein the recording policy includes a repository preference, wherein the repository preference includes an address of a repository, a name of the repository or a combination thereof.

14. The apparatus of claim 13, wherein the repository preference includes a series of alternate repositories for storing a recording.

15. A non-transitory computer readable medium including instructions that when executed are configured to cause a processor to:
   establish a communication session between a first endpoint and a second endpoint;
   access a recording policy associated with the first endpoint or the second endpoint;
   identify an anchor point based on the recording policy, wherein the recording policy specifies that when a device profile of the anchor point is indicative of a gateway, a near end device is selected and when the device profile is indicative of a phone, a far end device is selected; and
   generate a control message for the anchor point to forward the communication session for recording.

16. The non-transitory computer readable medium of claim 15, the instructions further configured to cause the processor to:
   receive a request to record the communication session from the first endpoint.

17. The non-transitory computer readable medium of claim 16, wherein the anchor point is the second endpoint.

18. The non-transitory computer readable medium of claim 15, wherein the recording policy lists the first endpoint and the second endpoint.

19. The non-transitory computer readable medium of claim 15, wherein the first endpoint is a phone and the second endpoint is a gateway.

* * * * *